United States Patent
Ushimaru et al.

(10) Patent No.: US 8,008,601 B2
(45) Date of Patent: Aug. 30, 2011

(54) LASER PROCESSING METHOD, LASER PROCESSING APPARATUS AND SPRING ARM MANUFACTURING METHOD

(75) Inventors: Akihiko Ushimaru, Kawasaki (JP); Yoshiaki Yanagida, Kawasaki (JP); Koji Sudo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 924 days.

(21) Appl. No.: 11/974,320

(22) Filed: Oct. 12, 2007

(65) Prior Publication Data

US 2008/0142492 A1 Jun. 19, 2008

(30) Foreign Application Priority Data

Dec. 19, 2006 (JP) ................................ 2006-341374

(51) Int. Cl.
*B23K 26/00* (2006.01)
(52) U.S. Cl. ............ 219/121.85; 219/121.6; 219/121.81
(58) Field of Classification Search ............... 219/121.8, 219/121.81, 121.85, 121.6; 72/342.1; 360/234.3
See application file for complete search history.

(56) References Cited

U.S. PATENT DOCUMENTS

| | | | | |
|---|---|---|---|---|
| 3,549,733 | A * | 12/1970 | Caddell | 219/121.85 |
| 5,687,597 | A * | 11/1997 | Girard | 72/342.1 |
| 6,011,239 | A * | 1/2000 | Singh et al. | 219/121.85 |
| 6,711,929 | B2 * | 3/2004 | Yamaguchi et al. | 219/121.85 |
| 6,837,092 | B1 * | 1/2005 | Ubl et al. | 72/342.1 |
| 2003/0075532 | A1 * | 4/2003 | Salmon et al. | 219/121.69 |
| 2003/0085720 | A1 * | 5/2003 | Yamazaki et al. | 324/752 |
| 2004/0037011 | A1 * | 2/2004 | Inoue et al. | 29/603.12 |
| 2005/0039828 | A1 * | 2/2005 | Nolan | 148/565 |

FOREIGN PATENT DOCUMENTS

| | | |
|---|---|---|
| JP | 01-227279 | 9/1989 |
| JP | 10-228741 | 8/1998 |
| JP | 2000-339894 | 12/2000 |

* cited by examiner

*Primary Examiner* — Geoffrey S Evans
(74) *Attorney, Agent, or Firm* — Fujitsu Patent Center

(57) ABSTRACT

A laser processing method includes the steps of: preparing a long metal object to be irradiated; and irradiating the object with a laser beam at a certain portion in a longitudinal direction of the object. The irradiation is performed along a width direction of the object for both a first half path from one end to the other end of the object in the width direction and a return path from the other end to the one end so that the object can be bent.

8 Claims, 5 Drawing Sheets

LASER PROCESSING METHOD, LASER PROCESSING APPARATUS AND SPRING ARM MANUFACTURING METHOD

BACKGROUND OF THE INVENTION

1. Field of the Invention

The present invention relates to a laser processing method and a laser processing apparatus in which an object to be irradiated is bent by being irradiated with a laser beam, and to a method of manufacturing a spring arm that holds at the end thereof a magnetic head for accessing data recorded on a disc.

2. Description of the Related Art

Conventionally, a magnetic disc apparatus has been equipped with a magnetic head that comes closer to a surface of a built-in disc and reads/writes data from/onto the disc.

The magnetic head is held at one end of a so-called spring arm formed of a long metal piece provided with spring force. The other end of the spring arm is coupled to an actuator so that the spring arm can be rotated around an arm shaft by the actuator, while the disc can be rotated by a motor. Accordingly, the magnetic head can be freely move above the disc.

Since the magnetic disc rotates so fast in the magnetic disc apparatus, when the magnetic head comes closer to the disc, air pressure is generated which pushes the magnetic head away from the disc and which is inversely proportionate to the distance between the magnetic head and the disc. In addition, the surface of the disc is macroscopically irregular. Therefore, spring force needs to be provided to the spring arm to keep the small distance uniform between the magnetic disc and the magnetic head.

For example, Japanese Patent Laid-Open No. 7-77063 has proposed a technique for causing a long metal piece to have spring force by irradiating the long metal piece with a laser beam at an approximate midpoint thereof in the longitudinal direction, so that the metal piece is bent at the midpoint.

However, the above technique has a problem that an end of the spring arm may be twisted relative to the root thereof around itself in the longitudinal direction. Especially, with such a twisted spring arm, a uniform distance between the high-speed rotating disc and the magnetic disc is hard to obtain.

Incidentally, such a twist may occur not only in manufacturing a spring arm but also in bending any long metal object by irradiating the object with a laser beam at a midpoint in the longitudinal direction thereof.

SUMMARY OF THE INVENTION

The present invention has been made in view of the above circumstances and provides a laser processing method, a laser processing apparatus that prevent a spring arm from being distorted, and a method of manufacturing the spring arm that is prevented from being distorted.

A laser processing method according to the present invention includes the steps of:

preparing a long metal object to be irradiated; and irradiating the object with a laser beam at a certain portion in a longitudinal direction of the object, the irradiation being performed along a width direction of the object for both a first half path from one end to the other end of the object in the width direction and a return path from the other end to the one end and thereby bending the object.

According to the laser processing method of the present invention, irradiation including a first half path and a return path is performed as a unit. Thus, it is possible to correct, in the return path, distortion occurred in the first path.

Preferably, the portion to be irradiated with the laser beam for the first half path differs from that for the return path in the longitudinal direction.

Such a feature allows similar distortion to occur in the first half path and return path. At the same time, metal fatigue can be suppressed more easily than the case where the irradiation runs the same route for the first half path and return path.

Further preferably, the laser processing method of the present invention may include the step of detecting distortion of the object, wherein the step of irradiating the object is a step of correcting the distortion detected in the step of detecting distortion of the object by irradiating the object with a laser beam such that a laser beam to run the first half path differs from a laser beam to run the return path in at least one of a crossing speed in the width direction, an output, and a spot diameter.

Alternatively, it is also preferable that the laser processing method of the present invention includes the step of detecting distortion of the object, wherein the laser beam is a pulsed beam, and wherein the step of irradiating the object is a step of correcting the distortion detected in the step of detecting distortion of the object by irradiating the object with a laser beam such that a laser beam to run the first half path differs from a laser beam to run the return path in at least one of a pulsed width and a pulsed interval.

The above features allow correction of distortion of the object while performing irradiation even when the distortion has been occurred before performing irradiation.

Here, it should be noted that the laser processing method according to the present invention may include the step of adjusting an angle of an end section in the longitudinal direction of the object by irradiating the end section with a laser beam after the step of irradiating the object.

A laser processing apparatus according to the present invention includes:

a laser emitting section having an emission opening through which a laser beam is emitted;

a base to which an object to be irradiated with the laser beam is fixed;

a relative position changing section that changes a relative position between the emission opening and the object; and a laser irradiation control section that causes the laser emitting section and the relative position changing section to cooperate with each other, so as to irradiate the object with a laser beam along a width direction of the object for both a first half path from one end to the other end of the object in the width direction and a return path from the other end to the one end.

A method of manufacturing a spring arm for holding at an end thereof a magnetic head that accesses data recorded on a magnetic disk, the method includes the steps of:

preparing a long metal object to be irradiated and to be thereby bent into the spring arm; and irradiating the object with a laser beam at a certain portion in a longitudinal direction of the object, the irradiation being performed along a width direction of the object for both a first half path from one end to the other end of the object in the width direction and for a return path from the other end to the one end, and thereby bending the object.

As described above, the present invention realizes a laser processing method, a laser processing apparatus that prevent a spring arm from being distorted, and a method of manufacturing the spring arm that is prevented from being distorted.

DETAILED DESCRIPTION OF THE INVENTION

Now, an embodiment of the present invention will be described with reference to the drawings.

Figure 1:
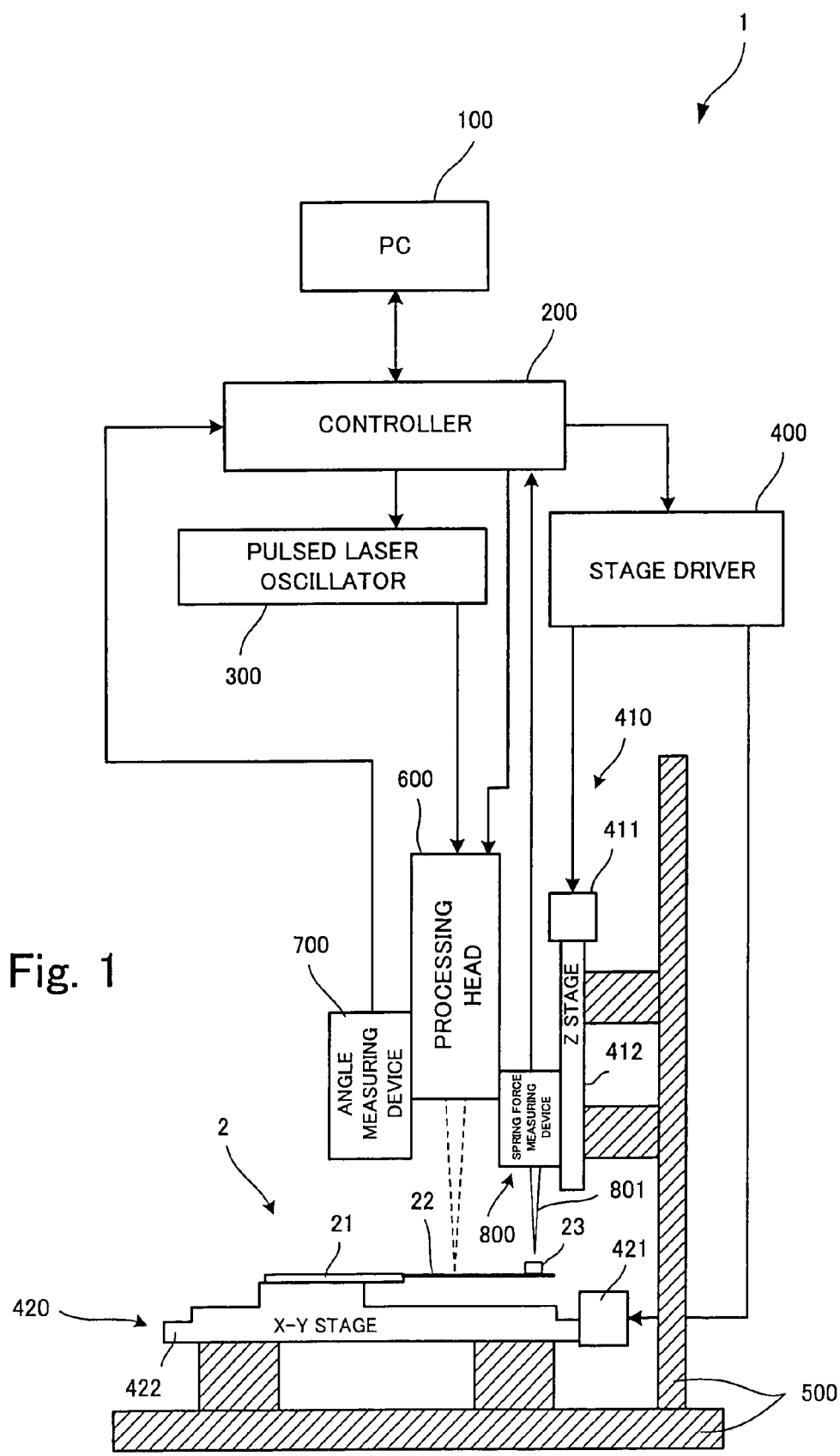
FIG. 1 is a side view of a laser processing apparatus according to an embodiment of the present invention, which also corresponds to an embodiment of a laser processing method of the present invention, and in which an embodiment of a spring arm manufacturing method of the present invention is implemented.

FIG. 1 is a side view of a laser processing apparatus 1 according to an embodiment of the present invention, which also corresponds to an embodiment of a laser processing method of the present invention, and in which an embodiment of a spring arm manufacturing method of the present invention is implemented.

FIG. 1 shows a schematic configuration of the laser processing apparatus 1 of the present embodiment. The laser processing apparatus 1 includes personal computer (hereafter referred to as PC) 100, controller 200, pulsed laser oscillator 300, stage driver 400, frame 500, processing head 600, angle measuring device 700, and spring force measuring device 800. The laser processing apparatus 1 applies bending to a long metal piece having a magnetic head attached to one end of the metal piece which exchanges data with a built-in disk of a magnetic disc apparatus by coming closer to the disk. By being bent, the metal piece is provided with spring force to be processed into a so-called spring arm.

Incidentally, a disk rotates so fast in a magnetic disc apparatus that air pressure arises which pushes the magnetic head away from the disc and is inversely proportional to a distance between the disk and the magnetic head. Further, the surface of the disc is microscopically irregular. Therefore, to keep a small distance uniform between the magnetic head and the disc, spring force should be applied to the long metal piece having a magnetic head attached to its end and thus the long metal piece provided with spring force is called a spring arm.

As shown in FIG. 1, the laser processing apparatus 1 further includes X-Y stage section 420 and Z stage section 410 both attached to the frame 500. Stainless long metal piece 2 is held onto the upper surface of X-Y stage 422 of the X-Y stage section 420. The spring force measuring device 800 for detecting spring force of the metal piece 2 held onto the upper surface of the X-Y stage 422 is attached to the upper surface of Z stage 412 of the Z stage section 410. The spring force measuring device 800 has contact terminal 801 that extends toward the metal piece 2. The contact terminal 801 contacts magnetic head 23 and thereby transmits a signal indicating the value of the pressure received from the magnetic head 23 to the PC 100 via the controller 200.

The X-Y stage section 420 and Z stage section 410 respectively have drive motors 421 and 411 which are electrically connected to the controller 200 via the stage driver 400. It should be noted that in the laser processing apparatus 1 the metal piece 2 can be moved lengthwise and widthwise on the X-Y stage 422 under an instruction from the stage driver 400 to the driving motor 421 for the X-Y stage section 420, but the position of the processing head 600 is fixed. Further, the spring force measuring device 800 can be moved vertically along the Z stage 412 under an instruction from the stage driver 400 to the driving motor 411 for the Z stage section 410, while the spring force measuring device 800 is to be attached to the Z stage 412 at a predetermined position on a surface of the Z stage 412 depending on the type of the metal piece 2.

The processing head 600 shown in FIG. 1 is optically connected to the pulsed laser oscillator 300. More specifically, in the laser processing apparatus 1, the PC 100 transmits numerical data such as pulse width, pulse interval, and output value to the controller 200 which in turn transmits a pulse signal based on the transmitted numerical data to the pulsed laser oscillator 300. The pulsed laser oscillator 300 emits pulsed laser corresponding to the received pulse signal to the processing head 600 which performs adjustment such as narrowing and focusing of pulsed laser under an instruction from the controller 200. Incidentally, FIG. 1 shows that the metal piece 2 held onto the X-Y stage 422 is irradiated at a midpoint in the longitudinal direction with a laser beam indicated by dotted lines.

The angle measuring device 700 shown in FIG. 1 detects distortion of the metal piece 2 and the angle of the magnetic head 23 attached to the end of the metal piece 2. The detection result is transmitted to the PC 100 via the controller 200 to which the angle measuring device 700 is electrically connected.

The metal piece 2 shown in FIG. 1 is formed by welding a thin flexure 22 having the magnetic head 23 attached thereto to a thick baseplate 21. Irradiation of a laser beam is applied to the flexure 22 welded to the baseplate 21 mounted on the X-Y stage 422.

The controller 200 shown in FIG. 1 controls the stage driver 400 under an instruction from the PC 100, which is one element of the laser processing apparatus 1. Such a mechanism allows control of a speed at which a laser beam crosses the metal piece 2.

From now on, a manufacturing process of a spring arm will be described. The manufacturing process for causing the metal piece 2 to have spring force is implemented in the laser processing apparatus 1.

Figure 2:
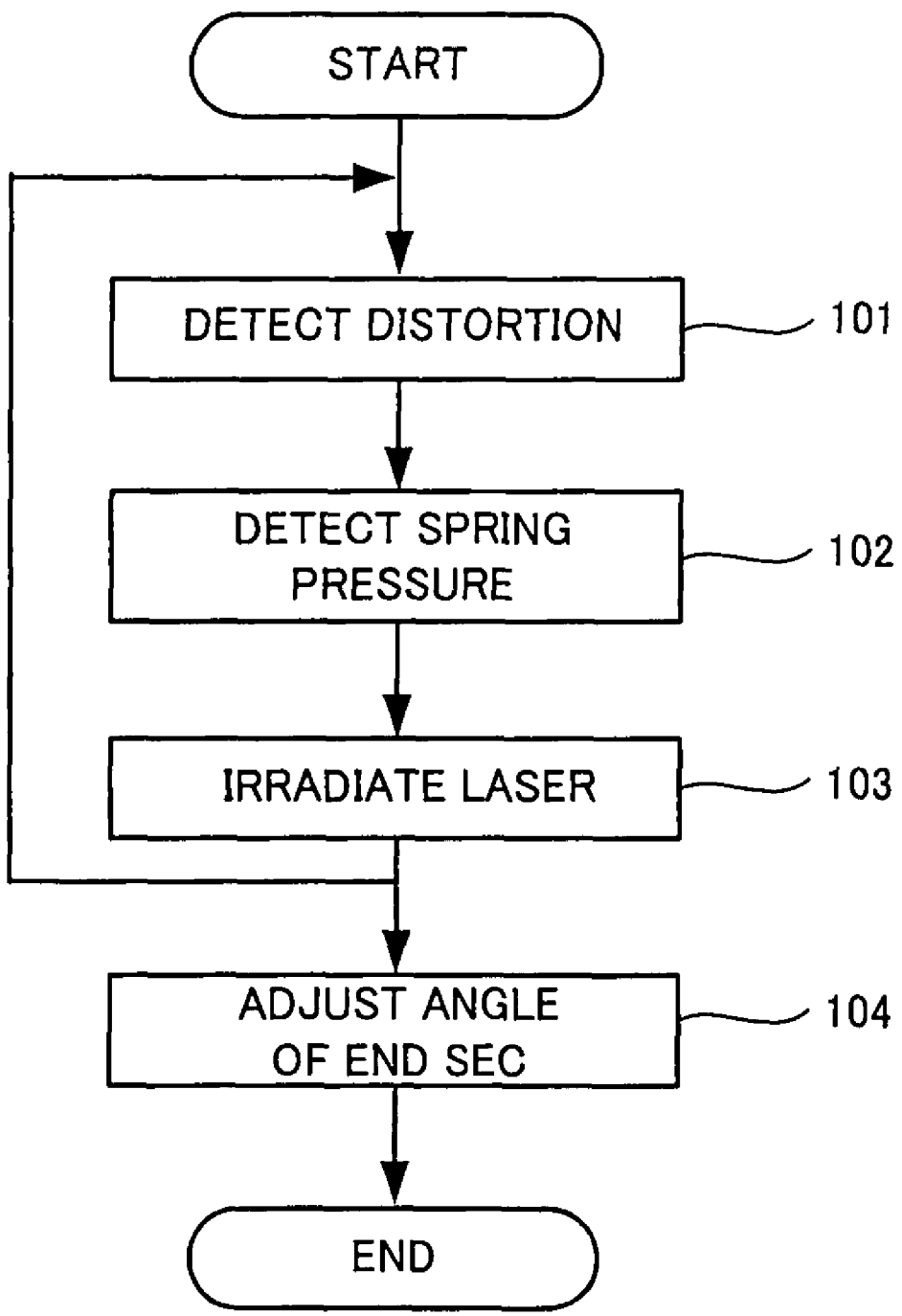
FIG. 2 is a flow chart showing a manufacturing process of the spring arm, which is implemented in the laser processing apparatus.

FIG. 2 is a flow chart showing the manufacturing process of a spring arm, which is implemented in the laser processing apparatus 1.

In step 101, it is detected whether there is distortion in the metal piece 2 mounted on the X-Y stage 422 of the laser processing apparatus 1. Subsequently, in step 102, spring force of the metal piece 2 is detected. Then, to correct distortion detected at step 101 if any, and to offset difference between the detected spring force and the target spring force, the flexure 22 of the metal piece 2 is irradiated widthwise with a laser beam. The irradiation is performed for both a first half path and a return path as a unit. Hereafter, irradiation performed for a first half path and a return path is called as one cycle of irradiation. A mode of a laser beam to be irradiated is determined by referring to a spring force reference table and a distortion reference table stored in the PC 100. The spring force reference table describes laser beam output value, crossing speed, spot diameter, and radiation route each of which is described for a first half path and a return path and varies depending on the difference between the detected spring force and the target spring force. The distortion reference table describes the difference in output value of a laser beam between a first half path and a return path which varies according to the amount of the detected distortion. For example, if no distortion is detected in step 101, a laser beam is emitted in the same manner for the first half path and return path according to the values described in the spring force reference table. On the other hand, if any distortion is detected, the value described in the distortion reference table according to the detected distortion should be taken in. Namely, the difference in the output value of a laser beam between the first half and return path according to the amount of detected distortion, which is described in the distortion reference table, is taken into the output value according to the detected spring force, such that the resultant output value does not exceed the corresponding output value either of the first half path and return path described in the spring force reference table. Accordingly, if no distortion is detected in step 101, it is highly likely that the target spring force can be obtained with one cycle of irradiation. However, if any distortion is detected, a laser beam having the output value equal to or less than that described in the spring force reference table is irradiated for either of the first half path and return path. Thus, it is likely that more than one cycle of irradiation is required to obtain the target spring force. It should be noted that the distortion reference table may list one or more of crossing speed, pulse width, spot diameter or pulse interval instead of difference in output value.

In step 103, laser beams having thus determined output values respectively for the first half path and return path are emitted. The irradiation is performed on the metal piece 2 at an approximate midpoint in the longitudinal direction, with the beam going from one end to the other end widthwise for the first half path and going back for the return path. It should be noted that the return path runs slightly off the first half path in the longitudinal direction. By making the return path to run a route different from the first half path, the same distortion as in the first half path will securely occur in the return path, when any distortion is not detected in step 101. Further, it is possible to suppress occurrence of metal fatigue.

Upon completion of one cycle of laser irradiation in step 103, the laser processing apparatus 1 goes back to steps 101 and 102. If any distortion is detected, and if the detected spring force is different from the target spring force, the mode of a laser beam is determined again so that the target spring force without distortion can be obtained. The laser beam of determined mode is emitted in step 103. After the metal piece 2 is provided with the target spring force without any distortion by going through the process from step 101 to step 103 once or plural times, the angle of the magnetic head 23 attached to an end section of the metal piece 2 is measured by the angle measuring device 700 and adjusted in step 104.

It should be noted here that the PC 100 stores an angle adjustment reference table in addition to the spring force reference table and distortion reference table. The angle adjustment reference table describes values including a laser output value and an irradiation position each of which varies depending on the difference between the measured angle of an end section of the metal piece 2 to which the magnetic head 23 is attached and the target angle.

Accordingly, in step 104, the metal piece 2 is irradiated with a laser beam having the output value based on the difference between the angle of the end section measured by the angle measuring device 700 and the target angle except the portion to which the magnetic head 23 is attached.

Here, of the laser beam irradiation in step 3 and angle adjustment in step 4 of FIG. 2, irradiation of a laser beam in step 3 will be described in detail, referring to FIGS. 3 and 4.

Figure 3:
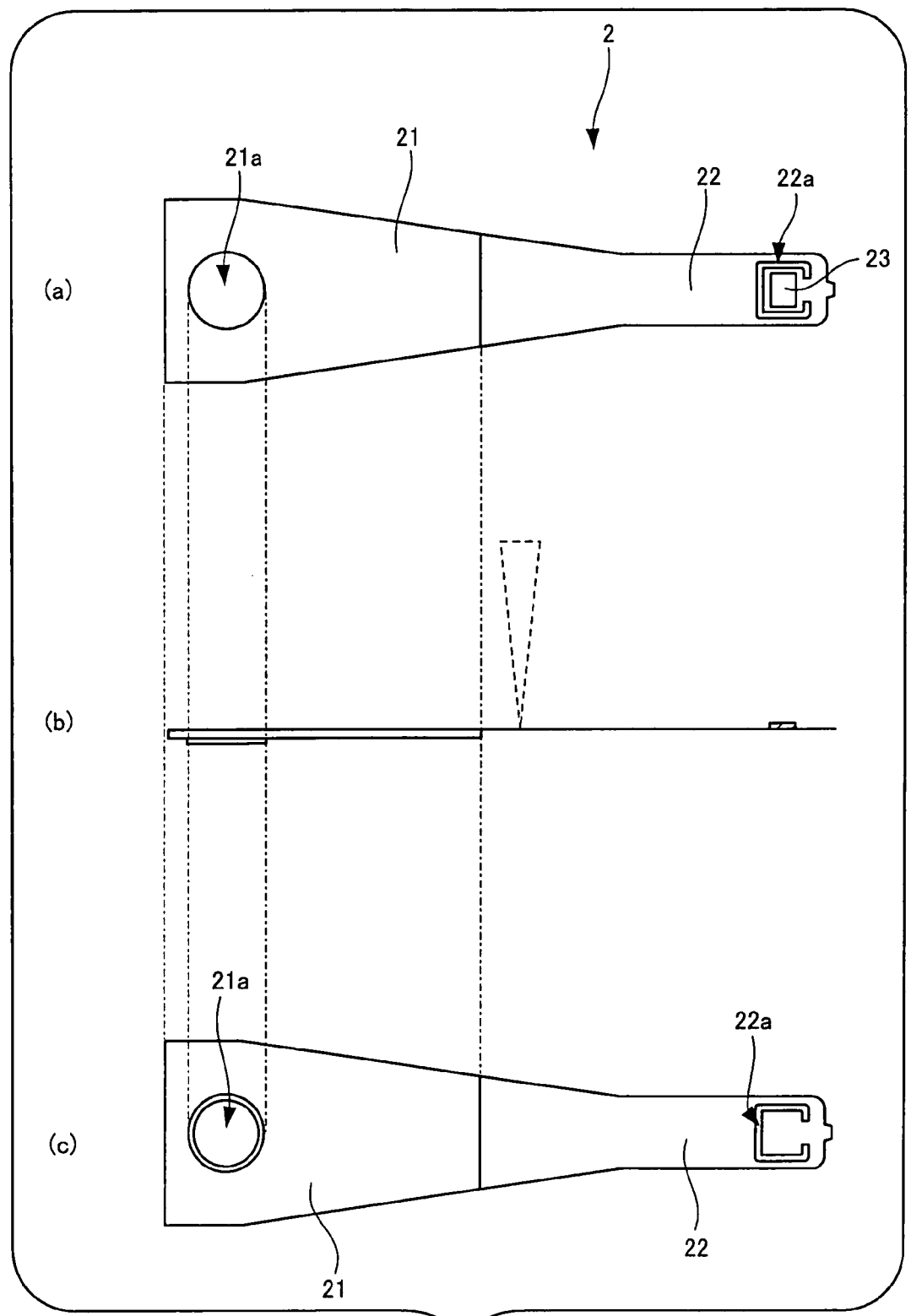
FIG. 3 is a diagram showing enlarged views of a metal piece shown in FIG. 1.

Parts (a)-(c) of FIG. 3 are enlarged views of the metal piece 2 shown in FIG. 1.

Specifically, part (a) of FIG. 3 is a top view of the metal piece 2, part (b) of FIG. 3 is a right side view of the same, and part (c) is a bottom view of the same. The metal piece 2 is formed by welding the thin flexure 22, to which the magnetic head 23 is attached, to the thick baseplate 21.

Incidentally, an opening 21*a* formed in the baseplate 21 is to be engaged with an actuator (not shown) such that the metal piece 2 rotates around the opening 21*a*.

The metal piece 2 is irradiated for both a first half path and a return path with a laser beam indicated by dotted lines as shown in part (b) of FIG. 3 at an approximate midpoint in the longitudinal direction. Subsequently, the metal piece 2 is bent at the irradiated midpoint into the side irradiated with the laser beam, so that it is provided with spring force. Additionally, a notch 22*a* is formed around the portion where the magnetic head 23 is attached. The notch 22*a* serves to provide local spring force for maintaining an appropriate angle of the magnetic head 23 with respect to the disk. It is noteworthy that the baseplate 21 has a thickness larger than that of the flexure 22 to make the spring arm rigid and thereby prevent the spring arm from being bent and colliding with the disk when the magnetic disk apparatus is subjected to impact.

After the spring arm that has no distortion and is provided with spring force is obtained, the angle of the magnetic head 23 is adjusted by irradiating the end section of the flexure 22 with a laser beam avoiding the portion where the magnetic head 23 is attached.

When there is a distorted metal piece 2 that is obtained by welding the flexure 22 to the baseplate 21, the laser processing apparatus 1 detects such distortion of the metal piece 2 by the angle measuring device 700 shown in FIG. 1. A signal indicating the distortion detected by the angle measuring device 700 is transmitted to the PC 100 via the controller 200.

The PC 100 of the laser processing apparatus 1 determines, based on the transmitted signal and referring to the table, laser beam output value, crossing speed, spot diameter, and irradiation route for each of a first half path and a return path.

Figure 4:
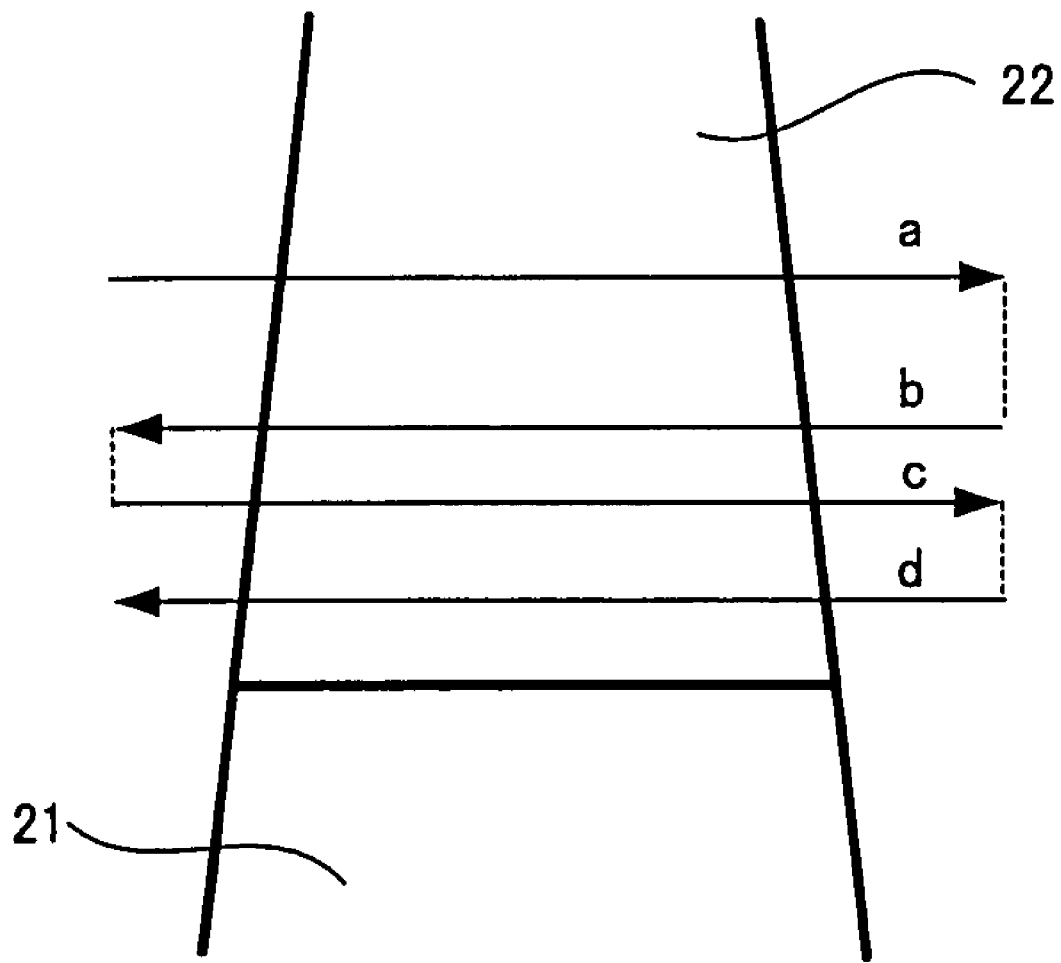
FIG. 4 is a diagram showing paths run by irradiation of a laser beam.

FIG. 4 is a diagram showing paths run by irradiation of a laser beam.

As shown in FIG. 4, irradiation of a laser beam is performed widthwise at an approximate midpoint in the longitudinal direction of the metal piece 2, by running in the first cycle a first path "a" and a return path "b," and in the second cycle a first path "c" and a return path "d."

Whenever a cycle of irradiation including a first half path and a return path is performed, it is judged whether distortion is corrected and the target spring force is obtained. Such judgment is performed until both requirements are met. In the example shown in FIG. 4, as the first cycle of irradiation does not meet both requirements, the second cycle of irradiation is performed. If both requirements are met, the angle of the magnetic head 23 is adjusted.

From now on, referring to FIG. 5, adjustment of the angle of the end section of the metal piece 2 to which the magnetic head 23 is attached, which corresponds to step 104 in FIG. 2, will be described in detail.

Figure 5:
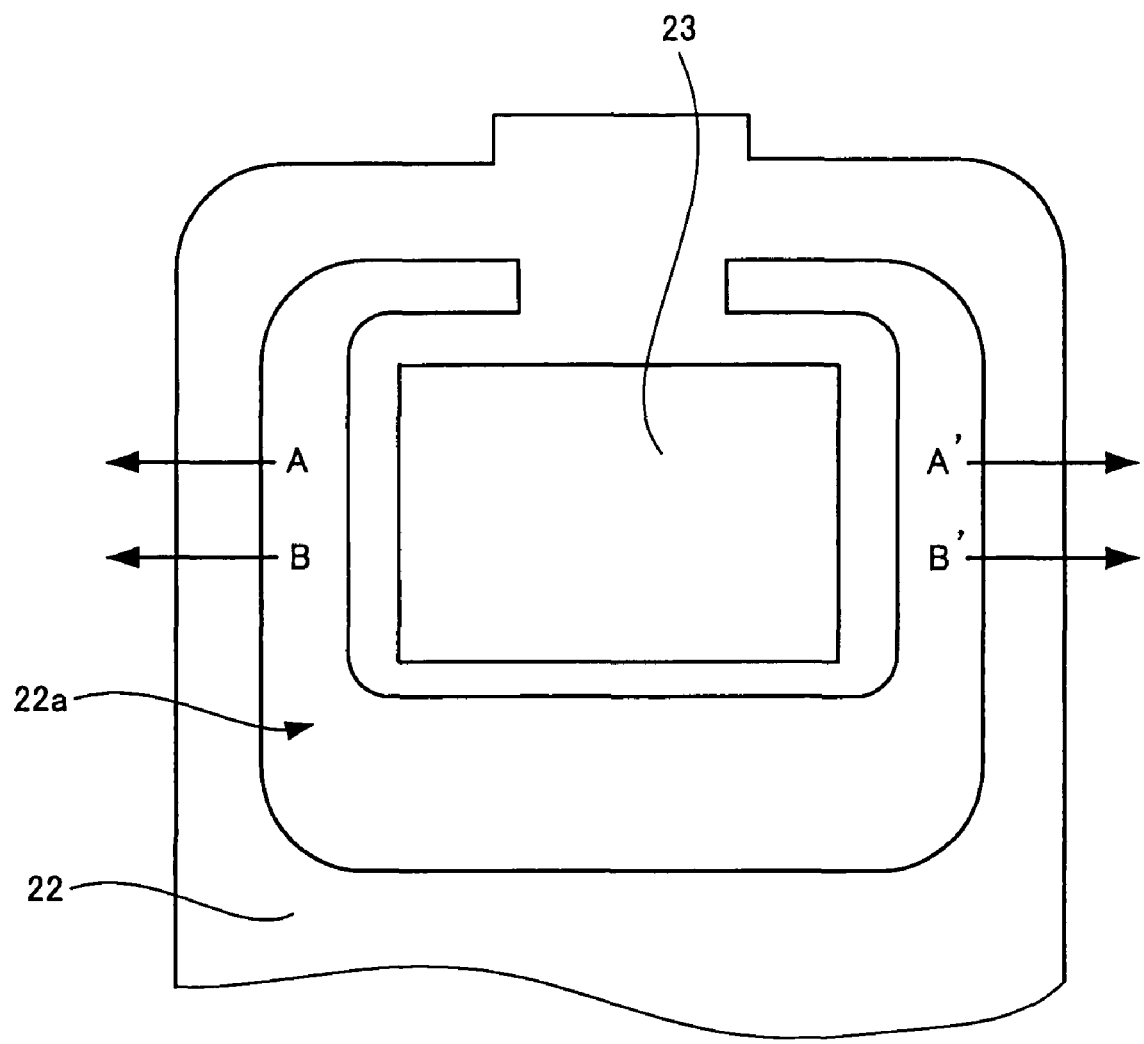
FIG. 5 is a diagram showing paths run by irradiation of a laser beam at the end section of the spring arm.

FIG. 5 is a diagram showing paths run by irradiation of a laser beam at the end section of the spring arm.

FIG. 5 also shows the notch 22*a* formed on the end section of the flexure 22 where the magnetic head 23 is attached.

Further, FIG. 5 shows the state where irradiation of a laser beam is performed, along the width direction of the spring arm symmetrically from the notch 22*a* to the outside the spring arm.

In the laser processing apparatus 1 of the present embodiment, the angle of the magnetic head 23 attached to the end section of the flexure 22 is measured by the angle measuring device 700 after distortion has been corrected and the target spring force has been obtained. Subsequently, as shown in FIG. 5, a laser beam having the output value determined by referring to the angle adjustment table based on the measured angle is irradiated for both paths A and A'. In this case, as it is found by the second measurement of the angle measuring device 700 that the target angle is not obtained by the first irradiation, the second irradiation having the output value determined based on the second measurement is performed for both paths B and B'.

As described above, the laser processing apparatus 1 realizes correction of distortion of the metal piece 2 and provision of the target spring force, by one or more cycles of irradiation of a laser beam each including a first half path and a return path, which is performed in the width direction at an approximate midpoint in the longitudinal direction of the metal piece 2. Additionally, the laser processing apparatus 1 realizes adjustment of the angle at the end section of the flexure 22, by irradiating the end section with a laser beam excluding the portion where magnetic head 23 is attached.

In the present embodiment, the descriptions refer to the case where an irradiation route differ between the first half path and return path. However, the present invention is not limited to such a case. The same irradiation route for the first half path and return path does not decrease the effect of the present invention. Additionally, in the embodiment, the metal piece 2 is moved with respect to the processing head 600 for being irradiated with a laser beam. However, the processing head 6 may be moved with respect to the metal piece 2 for irradiation of a laser beam.

What is claimed is:

1. A laser processing method comprising:
preparing a long metal object to be irradiated;
irradiating the object with a laser beam at a certain portion in a longitudinal direction of the object, the irradiation being performed along a width direction of the object for both a first half path from one end to the other end of the object in the width direction and a return path from the other end to the one end, and thereby bending the object; and
detecting distortion of the object, wherein
the irradiating the object includes correcting the distortion detected in the detecting distortion of the object by irradiating the object with a laser beam such that a laser beam to run the first half path differs from a laser beam to run the return path in at least one of a crossing speed in the width direction, an output intensity, and a spot diameter.

2. The laser processing method according to claim 1, wherein the portion to be irradiated with the laser beam for the first half path differs from that for the return path in the longitudinal direction.

3. The laser processing method according to claim 1, further comprising adjusting an angle of an end section in the longitudinal direction of the object by irradiating the end section with a laser beam after the irradiating the object.

4. A laser processing apparatus comprising:
a laser emitting section having an emission opening through which a laser beam is emitted;
a base to which an object to be irradiated with the laser beam is fixed;
a relative position changing section that changes a relative position between the emission opening and the object;
a laser irradiation control section that causes the laser emitting section and the relative position changing section to cooperate with each other, so as to irradiate the object with a laser beam along a width direction of the object for both a first half path from one end to the other end of the object in the width direction and a return path from the other end to the one end, and a distortion detecting section that detects distortion of the object, wherein
the laser emitting section corrects the distortion detected in the distortion detecting section by irradiating the object with a laser beam such that a laser beam to run the first half path differs from a laser beam to run the return path in at least one of a crossing speed in the width direction, an output intensity, and a spot diameter.

5. A method of manufacturing a spring arm for holding at an end thereof a magnetic head that accesses data recorded on a magnetic disk, the method comprising:
preparing a long metal object to be irradiated and to be thereby bent into the spring arm;
irradiating the object with a laser beam at a certain portion in a longitudinal direction of the object, the irradiation being performed along a width direction of the object for both a first half path from one end to the other end of the object in the width direction and for a return path from the other end to the one end, and thereby bending the object; and
detecting distortion of the object, wherein
the irradiating the object includes correcting the distortion detected in the detecting distortion of the object by irradiating the object with a laser beam such that a laser beam to run the first half path differs from a laser beam to run the return path in at least one of a crossing speed in the width direction, an output intensity, and a spot diameter.

6. A laser processing method comprising:
preparing a long metal object to be irradiated;
irradiating the object with a laser beam at a certain portion in a longitudinal direction of the object, the irradiation being performed along a width direction of the object for both a first half path from one end to the other end of the object in the width direction and a return path from the other end to the one end, and thereby bending the object; and
detecting distortion of the object, wherein
the laser beam is a pulsed beam, and
the irradiating the object is correcting the distortion detected in the detecting distortion of the object by irradiating the object with a laser beam such that a laser beam to run the first half path differs from a laser beam to run the return path in at least one of a pulsed width and a pulsed interval.

7. A laser processing apparatus comprising:
a laser emitting section having an emission opening through which a laser beam is emitted;
a base to which an object to be irradiated with the laser beam is fixed;
a relative position changing section that changes a relative position between the emission opening and the object;
a laser irradiation control section that causes the laser emitting section and the relative position changing section to cooperate with each other, so as to irradiate the object with a laser beam along a width direction of the object for both a first half path from one end to the other end of the object in the width direction and a return path from the other end to the one end; and
a distortion detecting section that detects distortion of the object, wherein
the laser beam is a pulsed beam, and
the laser emitting section corrects the distortion detected in the distortion detecting section by irradiating the object with a laser beam such that a laser beam to run the first half path differs from a laser beam to run the return path in at least one of a pulsed width and a pulsed interval.

8. A method of manufacturing a spring arm for holding at an end thereof a magnetic head that accesses data recorded on a magnetic disk, the method comprising:

preparing a long metal object to be irradiated and to be thereby bent into the spring arm;

irradiating the object with a laser beam at a certain portion in a longitudinal direction of the object, the irradiation being performed along a width direction of the object for both a first half path from one end to the other end of the object in the width direction and for a return path from the other end to the one end, and thereby bending the object; and detecting distortion of the object, wherein the laser beam is a pulsed beam, and the irradiating the object is correcting the distortion detected in the detecting distortion of the object by irradiating the object with a laser beam such that a laser beam to run the first half path differs from a laser beam to run the return path in at least one of a pulsed width and a pulsed interval.

* * * * *